US006418980B1

(12) United States Patent
Larquet et al.

(10) Patent No.: US 6,418,980 B1
(45) Date of Patent: Jul. 16, 2002

(54) METHOD FOR FILLING GAS-INSULATED ELECTRIC CURRENT TRANSMISSION LINES WITH GAS AND PROCESS FOR MANUFACTURING LINES WHICH INCORPORATES SUCH A FILLING METHOD

(75) Inventors: Christian Larquet, Guyancourt; Bertrand Dutournier, Mont St Aignan; Philippe Brosseau, Auvers sur Oise; Jean-Louis Dumas, Bievres, all of (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/470,977

(22) Filed: Dec. 23, 1999

(30) Foreign Application Priority Data

Dec. 24, 1998 (FR) .............................. 98 16453

(51) Int. Cl.⁷ ................................ B65B 1/04
(52) U.S. Cl. ............... 141/4; 141/66; 29/825; 29/828
(58) Field of Search ............... 141/2, 4, 8, 65, 141/66, 59, 67, 9, 100; 29/825, 828; 174/110 R, 102 R

(56) References Cited

U.S. PATENT DOCUMENTS 3,464,434 A    9/1969 Nielsen
4,066,486 A  * 1/1978 Tan .............................. 141/18
4,277,254 A    7/1981 Hanson
4,336,414 A    6/1982 Suzuki et al.
4,621,927 A   11/1986 Hiroi
4,734,371 A    3/1988 Schmolke et al.
5,911,248 A  * 6/1999 Keller .......................... 141/59

FOREIGN PATENT DOCUMENTS

EP        0 597 374    5/1994
EP        0 671 680    9/1995
WO        98/23363     6/1998

\* cited by examiner

Primary Examiner—Steven O. Douglas
(74) Attorney, Agent, or Firm—Burns, Doane, Swecker & Mathis, L.L.P.

(57) ABSTRACT

A method for filling a gas-insulated electric current transmission line with gas using an insulating gas mixture, which line comprises an outer tubular sheath, at least one conductor internal to the sheath and coaxial with this sheath, and a space lying between the at least one conductor and the outer sheath, comprising the steps of:

a) applying at least one purging cycle to the space comprising:
   a pumping step, down to a first vacuum level;
   a purge step comprising introducing a purge gas and obtaining a first internal atmosphere including the purge gas;
b) applying to the space a filling cycle comprising:
   a pumping step, down to a second vacuum level;
   a filling step using the insulating gas to obtain a second internal atmosphere.

10 Claims, 2 Drawing Sheets

METHOD FOR FILLING GAS-INSULATED ELECTRIC CURRENT TRANSMISSION LINES WITH GAS AND PROCESS FOR MANUFACTURING LINES WHICH INCORPORATES SUCH A FILLING METHOD

BACKGROUND OF THE INVENTION (i) Field of the Invention

The present invention relates to the field of so-called "gas-insulated" high-voltage current transmission lines (the name GIL is often found in the literature).

(ii) Description of the Related Art

In this field, there is a clear tendency to restrict the existence and installation of overhead high-voltage lines in preference to so-called "gas-insulated" lines or else solid-insulation lines which it is possible to bury.

It will be recalled here that the typical structure of such current transmission lines or cables comprises an outer tubular sheath and at least one conductor which is internal to the sheath and which is coaxial with this sheath, the internal conductor or conductors of the cable being insulatingly supported on the internal structure of the outer sheath, the space lying between internal conductor(s) and outer sheath being filled with a insulating gas mixture.

Quite recent and extensive literature thus mentions, as insulating gases, $SF_6$ or else gas mixtures based on $SF_6$ (of which $SF_6$ the electrical insulation properties over a wide temperature range are well known), as well as the possible problems of recovering, purifying and recycling the $SF_6$ used in such electrical engineering applications.

By way of illustration, the following documents will be mentioned here: DE-19,623,723, DE-3,122,886, DE-19,503,227, WO-98/23363, US-2,415,763, EP-820,801 and US-4,705,914.

The literature also mentions, as insulating gas mixtures, mixtures based on $CO_2$, $CF_4$ or $SO_2$.

What is immediately apparent from reading all this literature is the fact that, among the main difficulties in this technology of gas-insulated lines using $SF_6$, one finds, on the one hand, the fact that losses due to $SF_6$ leakage must comply with the extremely restrictive international standards (in practice, they must not exceed 1% per year of the $SF_6$ introduced) and, on the other hand, the difficulties associated with controlling the handling of the gases involved and the filling phase in order to meet the required specifications, especially in terms of residual content of oxygen and of water vapor in the insulating atmosphere internal to the line.

The WO document mentioned above proposes, for example, a method for producing a mixture containing $SF_6$ in two stages: firstly the manufacture of an inhomogeneous premixture, then the storage of this premixture in a buffer tank, if necessary it having been passed beforehand through a static mixer, the buffer tank then being continuously repressurized by the fact that some of the mixture coming from the tank is compressed and recycled into the buffer tank.

It is therefore recognized that there is a real need to have a simple and reliable process for producing such insulating gas mixtures based especially on $SF_6$, as well as improved methods of filling such gas-insulated electric current transmission lines with gas that allow the required specifications to be met.

SUMMARY AND OBJECTS OF THE INVENTION

One of the objectives of the present invention is to propose a solution to the technical problems listed above.

To do this, the invention relates to a method for filling so-called gas-insulated electric current transmission lines with gas using an insulating gas mixture, which line comprises an outer tubular sheath and at least one conductor internal to the sheath and coaxial with this sheath, which method comprises the implementation of the following steps, applied to the space lying between the internal conductor or conductors and the outer sheath:

a) application to said space of at least one purge cycle comprising:
   a pumping step, down to a first vacuum level;
   a purge step by introducing a purge gas;
b) application to said space of a filling cycle comprising:
   a pumping step, down to a second vacuum level;
   a filling step using said insulating gas.

The gas-filling method according to the invention may moreover adopt one or more of the following characteristics:
   the first vacuum level is less than 50 mbar, and preferably lying within a range going from 5 to 20 millibars;
   the second vacuum level is less than 100 mbar, and preferably lying within a range going from 0.1 to 20 millibars;
   the atmosphere internal to the line as obtained after the purge cycle or cycles is analyzed in terms of at least one gaseous component;
   the atmosphere internal to the line as obtained after the filling step of the filling cycle is analyzed in terms of at least one gaseous component;
   the pressure in the line is measured after the pumping step of the filling cycle.

The invention also relates to a process for manufacturing so-called gas-insulated electric current transmission lines, lines of the type comprising an outer tubular sheath and at least one conductor internal to the sheath and coaxial with this sheath, the process comprising a phase of filling the space lying between the internal conductor or conductors and the outer sheath using an insulating gas mixture and carrying out the filling phase by applying the method for filling electric current transmission lines with gas as described above.

The invention also relates to a process for producing a homogeneous gas mixture containing $SF_6$ and a carrier gas, which process comprises the implementation of the following measures:
   a first line for supplying a primary gas containing $SF_6$ is used;
   a second line for supplying a carrier gas is used;
   one of the two supply lines is equipped with a flow measurement device while the other line is then equipped with a flow-regulating device;
   the two supply lines are connected at their downstream part to a line for delivering the mixture to a consumer point;
   using a pressure-regulating device located in the delivery line, the pressure of the mixture delivered by the delivery line downstream of the points of connection of the supply lines is regulated.

The process for producing a homogeneous gas mixture containing $SF_6$ and a carrier gas according to the invention may moreover include one or more of the following characteristics:
   a dynamic mixing device, located in the delivery line upstream of said pressure-regulating device, is used;
   a dynamic mixing device, located in the delivery line between said pressure-regulating device and the consumer point, is used;

the dynamic mixer consists of a pipe having, over all or part of its length, a nonrectilinear structure of turns, the pipe being provided with a gas inlet connected to an upstream part of the delivery line and with a gas outlet connected to a downstream part of the delivery line;

pressure regulation is achieved by the presence, in the delivery line, of a device chosen from the group consisting of a control valve, a backpressure regulator, a calibrated orifice and a flow regulator.

The notion of "dynamic" mixing according to the invention should be understood to mean the fact of producing, in the mixer, a minimum pressure drop, without a stagnation region or region of zero gas velocity.

Further characteristics and advantages will merge from the following description, given solely by way of example, and with reference to the appended drawings.

DETAILED DESCRIPTION OF PREFERRED EMBODIMENTS

Figure 1:
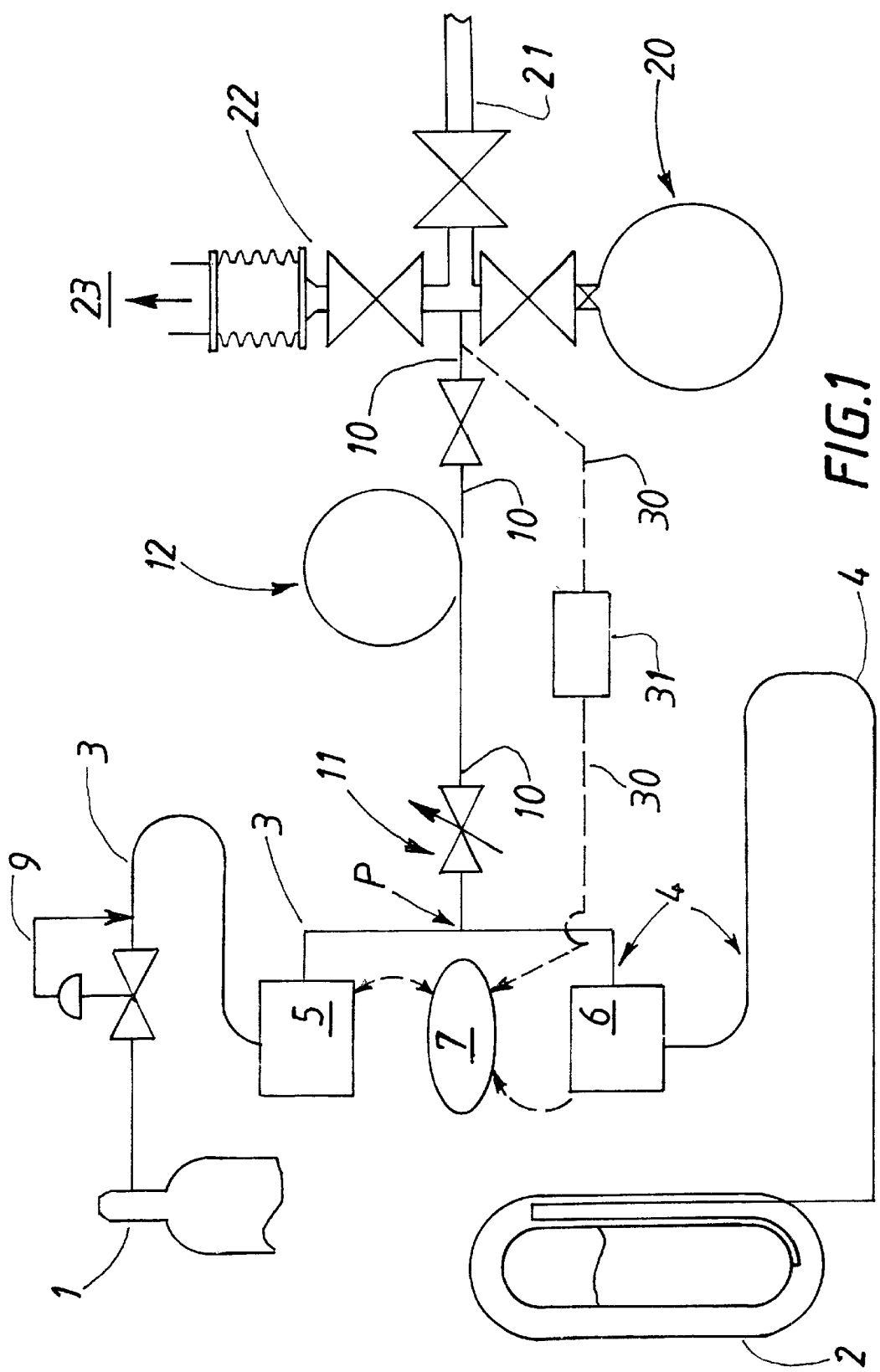
FIG. 1 is a schematic illustration of a plant for filling gas-insulated transmission lines with gas, incorporating a plant for producing a homogeneous gas mixture containing $SF_6$ and a carrier gas, according to the invention.

FIG. 1 shows a first source 1 of a primary gas which contains $SF_6$ and a second source 2 of a carrier gas, in this case here, for the embodiment illustrated, a store of liquid nitrogen.

The primary gas containing $SF_6$ coming from the source 1 (whether this is pure $SF_6$ or else a mixture containing $SF_6$, for example a recovery mixture coming from a prior use of insulated cables) is directed toward the mixing point along a supply line 3, passing through a pressure-reducing valve 9 and through a flow regulator 5 (for example a mass-flow regulator).

In its downstream part, the supply line 3 is connected to a delivery line 10 at a point shown symbolically as P in the figure.

Moreover, the liquid nitrogen coming from the source 2 is warmed by a heater (not illustrated) and the resulting gas conveyed to the mixing point via a second supply line 4, passing through a flow meter 6, the second supply line 4 therefore being also connected at its downstream part to the delivery line 10.

As will be clearly apparent to those skilled in the art, the physical configuration of this point P may vary greatly, without departing from the scope of the present invention, whether this is a simple T point or alternatively, by way of illustration, a volume container.

The delivery line 10 is capable of delivering the mixture thus formed to the consumer point, that is to say to an electrical transmission line shown symbolically here in circular cross section by the reference 20.

According to the invention, the delivery line 10 is provided, downstream of the point of connection P of the two supply lines 3 and 4, with an upstream pressure-regulating device 11, in this case for the embodiment illustrated a flow control valve, as well as a dynamic mixer 12, in this case consisting of a combination of circular turns.

As already mentioned, although the configuration illustrated here shows a dynamic mixer 12 located downstream of the device 11, it would also be possible according to the invention to provide a dynamic mixer 12 inserted between the point P and the regulating device 11.

Likewise, although the configuration illustrated here shows, as "pressure-regulating" device 11, the use of a flow control valve, it would not be outside the scope of the present invention also to use a flow regulator whose presence would have, as is also known, the effect of fixing and regulating the pressure between the point P and the device 11.

The mixture thus formed and perfectly homogenized is delivered to the consumer point 20 and means are moreover provided in the plant for venting the cable (line 21) or else for pumping out the previously introduced atmosphere via the line 22 connected to a vacuum pump 23; the pumping means will be explained in greater detail in the context of FIG. 2.

FIG. 1 also shows a data acquisition and processing unit 7 (for example a programmable controller) capable not only of receiving data such as data from the analysis of the mixture produced in terms of one or more components (line 30 and analyzer 31 in FIG. 1) or, by way of illustration, flow data coming from the flow meter 6 and the flow regulator 5, but also, depending on the flow requirements of the consumer point or depending on the abovementioned analytical results, of carrying out a feedback operation on the flow regulator 5 so as to modify the parameters of the mixture produced.

As will have been understood on reading the foregoing, the arrangement claimed allows excellent control and excellent compositional stability of the mixture transported and delivered to the final consumer point, despite the continuing variation in the downstream pressure in the line to be filled (in fact, this pressure necessarily varies continually because of the fact that the line is being filled).

According to one embodiment of the invention, the pressure-reducing valve 9, the flow regulator 5, the portion of line 3 between pressure-reducing valve 6 and regulator 5, as well as the portion of line 3 between the regulator 5 and the point P, and the pressure-regulating device 11, are heated to a temperature greater than the liquefaction point of $SF_6$ under the conditions of the mixing, for example by these all being placed inside a heating cabinet.

Such an embodiment will be most particularly advantageous depending on the pressure conditions applied, especially at the consumer point 20.

Figure 2:
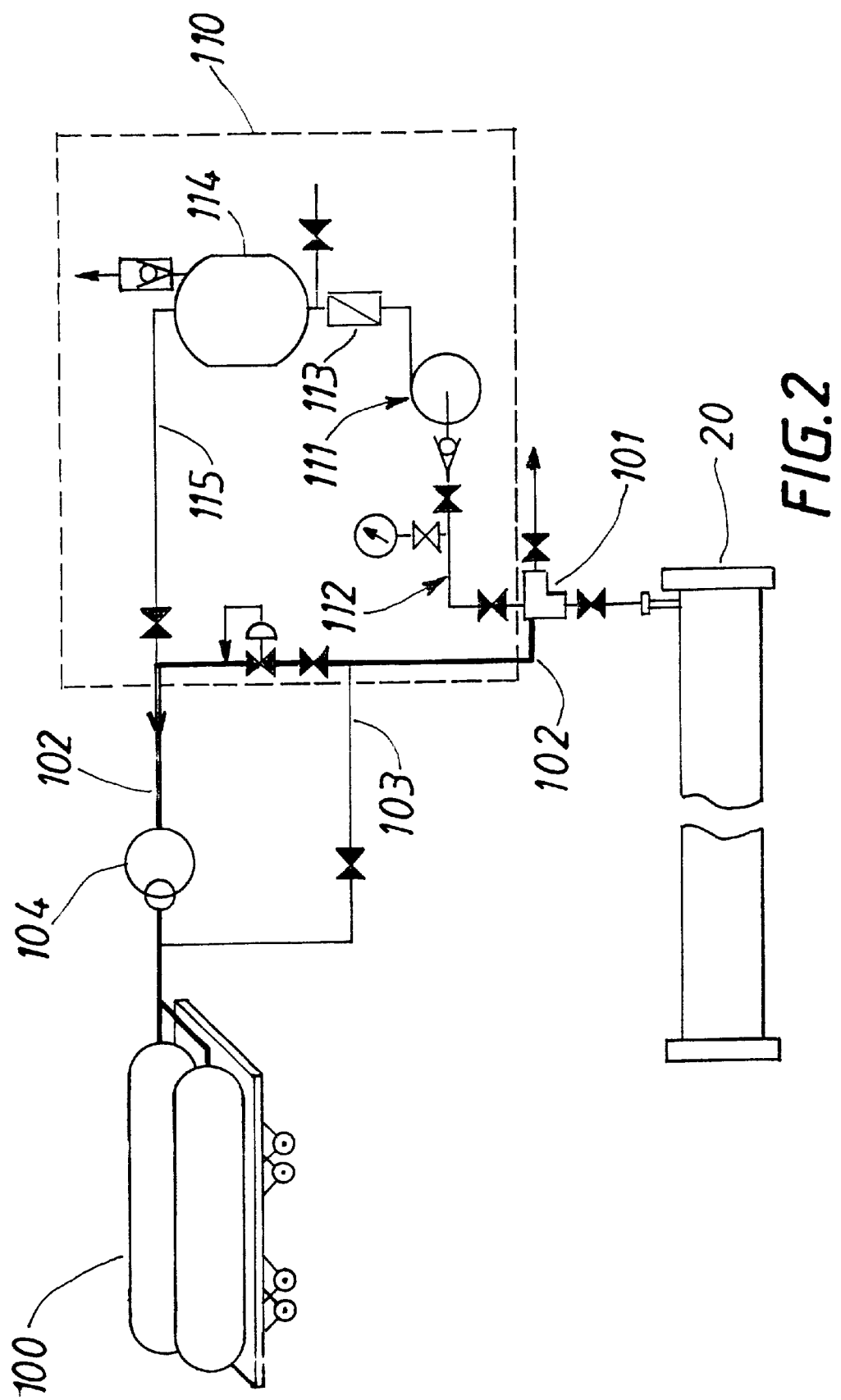
FIG. 2 is a schematic illustration of a plant for draining and recovering the $SF_6$ or mixture containing $SF_6$ previously introduced into gas-insulated lines.

As regards FIG. 2, this illustrates, schematically, a plant for recovering and storing the insulating gas previously introduced into a current transmission line. It will be understood that this plant is most particularly suitable for recovering the gas and storing it, for the purpose, depending on the circumstances, of reusing it, purifying it or destroying it, this situation arising after, for one reason or another, the cable has to be opened (dismantlement, incident, maintenance, etc.).

FIG. 2 therefore shows, apart from the line 20 already mentioned previously, storage devices 100, (such as cylinders) intended to house the recovered insulating gas.

Depending therefore on the involvement of factors such as the pressure of the gas in the line, or else the state of impurity of the gas to be recovered (for example, following a breakdown), the plant in FIG. 2, and in particular its pumping set 110, will be used in the following manner:

the gas may, by means of the directing device 101 and the set of valves present on each line, be directed firstly into the storage containers 100 via the line 102 and then via the line 103, passing through a compressor 104;

once atmospheric pressure has been reached in the current line, it is possible to continue the recovery by making the gas travel via the line 112 which is provided with a pumping device 111 (a vacuum pump), as well as with a purification station 113 (oil, dust, etc.) and with an intermediate storage tank 114 (the tank 114 advantageously providing the link, as may be seen, between the vacuum pump 111 and the compressor 104.

After such a gas recovery operation (more or less complete, moreover), the line may then, depending on the circumstances, be destroyed, vented or purged using an inert gas such as nitrogen.

As was in fact seen previously, such an operation of recovering the insulating gas initially contained in the line 20 in order to store it in the storage tanks 100 may be carried out at times that vary greatly during the life of such a current transmission line; stoppage and dismantlement of the line, maintenance, repair, opening following an operating incident, etc.

It will therefore be understood that the gas thus recovered and stored in the storage tanks 100 may, depending on the circumstances, be reused as it is, purified before use (using methods such as adsorption, or else membrane separation, methods itemized in the abovementioned literature), or even destroyed (for example using a plasma; reference may also be made to the abovementioned literature).

A plant such as that described in the context of FIG. 1 has been used for filling a test portion of a high-voltage current transmission line with gas (portion about 20 m, diameter approximately 0.48 m) using an $N_2/SF_6$ insulating mixture containing 10 vol % of $SF_6$ at a pressure of about 8 bars absolute (therefore 8 bars on the output side of the regulating valve 11).

The primary source 1 containing $SF_6$ was a container of pure (therefore liquid/gas two-phase) $SF_6$.

The method of filling the line with gas therefore comprises the implementation of the following steps, applied to the space lying between the internal conductor and the outer sheath:

a) application of a purge cycle comprising:
  a pumping step in which, starting from a pressure close to atmospheric pressure, a first vacuum level close to 10 mbars is reached after approximately ½ an hour;
  a purge step by introducing nitrogen of cryogenic origin (residual oxygen content of less than 10 ppm and a dew point close to −60° C.) into the line, at a pressure close to 9 bars absolute and over a period of approximately 2 hours;
  the line is maintained under nitrogen for approximately 1 hour;

b) application of a filling cycle using the insulating gas, the cycle comprising:
  a pumping step, down to a second vacuum level close to 0.2 mbar, this pumping step being carried out over a period of about 2 hours;
  a filling step using the insulating mixture containing 10% $SF_6$ in nitrogen (pressure 8 bars absolute), this filling step taking place over a period of approximately 7 hours.

The results observed may be summarized as follows:

at the end of the nitrogen purge step (purge cycle), a residual oxygen content of close to 216 ppm and a water vapor content close to 21.6 ppm are obtained;

next, at the end of filling using the insulating gas, an insulating atmosphere is obtained in the line, the residual oxygen content of which is less than 20 ppm and the residual water vapor content of which is less than 200 ppm, in compliance with the specification desired by the manufacturing of the current transmission line in question.

It should be noted that the gas filling method thus employed according to the invention, alternating between controlling pumping/purge/filling steps, proves to be incomparably more effective than a conventional method in which a single pumping step is used to go down to the desired final pressure of 0.2 mbar, before being able to fill using the insulating gas, the single pumping step then necessarily lasting several days in view of the dimensions of the line involved.

It should also be noted that a filling method according to the invention, comprising cycles similar to that described above in the case of the 20 meter test portion, was tested on another test portion having a length of approximately 300 meters, with here too in the end atmosphere performance characteristics which meet the specification already mentioned.

What is claimed is:

1. A method for filling a gas-insulated electric current transmission line with gas using an insulating gas mixture, which line comprises an outer tubular sheath, at least one conductor internal to the sheath and coaxial with this sheath, and a space lying between the at least one conductor and the outer sheath, comprising the steps of:
  a) applying at least one purging cycle to said space comprising:
    a pumping step, down to a first vacuum level;
    a purge step comprising introducing a purge gas and obtaining a first internal atmosphere including said purge gas;
  b) applying to said space a filling cycle comprising:
    a pumping step, down to a second vacuum level;
    a filling step using said insulating gas to obtain a second internal atmosphere.

2. The filling method according to claim 1, wherein said first vacuum level is less than 50 mbar.

3. The filling method according to claim 2, wherein said first vacuum level is within a range going from 5 to 20 mbar.

4. The filling method according to claim 1, wherein said second vacuum level is less than 100 mbar.

5. The filling method according to claim 4, wherein said second vacuum level is within a range going from 0.1 to 20 mbar.

6. The filling method according to claim 1, wherein said first vacuum level is less than 50 mbar and said second vacuum level is less than 100 mbar.

7. The filling method according to claim 1, further comprising the step of analyzing at least one gaseous component in the first atmosphere internal to the line as obtained after the purge cycle or cycles.

8. The filling method according to claim 1, further comprising the step of analyzing at least one gaseous component in the second atmosphere internal to the line as obtained after the filling step of the filling cycle.

9. The filling method according to claim 1, further comprising the step of measuring pressure in the line after the pumping step of the filling cycle.

10. A process for manufacturing a gas-insulated electric current transmission line comprising an outer tubular sheath, at least one conductor internal to the sheath and coaxial with this sheath, and a space lying between the internal conductor or conductors and the outer sheath comprising the step of filling said space with an insulating gas mixture by applying the filling method as claimed according to claim 1.

* * * * *